(12) United States Patent
Tanaka et al.

(10) Patent No.: US 7,875,835 B2
(45) Date of Patent: Jan. 25, 2011

(54) HEATING COMPONENT FOR PIPE JOINT

(75) Inventors: Yasuhiro Tanaka, Ageo (JP); Atsushi Izumi, Nabari (JP); Akinobu Tsuda, Nabari (JP); Kazunori Sawada, Nabari (JP)

(73) Assignees: Nissan Diesel Motor Co., Ltd., Ageo (JP); Nitta Moore Company, Osaka (JP)

( * ) Notice: Subject to any disclaimer, the term of this patent is extended or adjusted under 35 U.S.C. 154(b) by 0 days.

(21) Appl. No.: 11/790,538

(22) Filed: Apr. 26, 2007

(65) Prior Publication Data

US 2007/0257026 A1 Nov. 8, 2007

Related U.S. Application Data

(63) Continuation of application No. PCT/JP2006/308778, filed on Apr. 26, 2006.

(51) Int. Cl.
*H05B 3/40* (2006.01)
*F24H 1/14* (2006.01)

(52) U.S. Cl. .................. 219/535; 138/33; 219/520; 392/480

(58) Field of Classification Search ............. 219/235, 219/536, 538, 544, 546, 548, 520, 535; 285/21, 285/292; 392/304, 465, 480, 481; 156/304.2, 156/379.7
See application file for complete search history.

(56) References Cited

U.S. PATENT DOCUMENTS

| | | | | |
|---|---|---|---|---|
| 2,739,829 A | * | 3/1956 | Cundiff et. al. ............ 285/21.2 |
| 3,766,357 A | * | 10/1973 | Koester, Jr. .................. 392/478 |
| 4,205,221 A | * | 5/1980 | Meyer ........................ 219/230 |
| 4,438,325 A | * | 3/1984 | Gellert ....................... 219/536 |
| 4,508,368 A | * | 4/1985 | Blumenkranz ............. 285/21.2 |
| 4,571,488 A | * | 2/1986 | Reeves ........................ 219/544 |
| 4,602,148 A | * | 7/1986 | Ramsey ...................... 219/535 |
| 4,629,216 A | * | 12/1986 | Pedersen ................... 285/21.2 |
| 4,631,107 A | * | 12/1986 | Ramsey ...................... 156/359 |
| 5,182,440 A | * | 1/1993 | Dufour et al. ............... 219/535 |
| 5,354,100 A | * | 10/1994 | Wall et al. ................. 285/21.2 |

(Continued)

FOREIGN PATENT DOCUMENTS

JP 62-16887 1/1987

(Continued)

*Primary Examiner*—Geoffrey S. Evans
*Assistant Examiner*—Vinod D Patel
(74) *Attorney, Agent, or Firm*—Baker & Hostetler LLP

(57) ABSTRACT

The present invention makes a proposal of a heating component for a pipe joint which can be easily mounted on a pipe joint and also can stabilize the assembly quality to the pipe joint. The heating component for a pipe joint is characterized in that the heating component for a pipe joint has partially thereon fitting portions each having an inner face shape fitted with a part of an outer shape of the pipe joint, and also, a holding recess portion for holding therein a heating wire is formed on an inner face portion other than the fitting portions; when the heating wire is held in the holding recess portion, and then, the heating component for piping joint is mounted to the joint by fitting the fitting portions with the parts of the outer shape of the joint, the heating wire held in the holding recess portion comes in contact with the pipe joint.

8 Claims, 6 Drawing Sheets

U.S. PATENT DOCUMENTS

| | | |
|---|---|---|
| 5,639,394 A * | 6/1997 | Conley .................. 219/535 |
| 5,779,843 A * | 7/1998 | Kumagai et al. ......... 156/274.2 |
| 7,204,520 B2 * | 4/2007 | Mueller et al. ............ 285/21.1 |

FOREIGN PATENT DOCUMENTS

| | | |
|---|---|---|
| JP | 04-102793 | 4/1992 |
| JP | 2636029 | 7/1997 |
| JP | H09-273698 | 10/1997 |
| JP | 11-159665 | 6/1999 |
| JP | 2002-071067 | 3/2002 |

* cited by examiner

HEATING COMPONENT FOR PIPE JOINT

This application is a continuation of PCT/JP2006/308778 filed on Apr. 26, 2006.

BACKGROUND OF THE INVENTION

1. Filed of the Invention

The present invention generally relates to a heating structure suitable for applying heat to a joint used for providing a connection between piping or to a joint used for providing a connection between a pipe and an associated device.

2. Description of the Related Art

In recent years, as an exhaust emission purifying apparatus for purifying nitrogen oxides ($NO_x$) contained in the exhaust gas of a diesel engine, there has been proposed a selective catalytic reduction (SCR) apparatus using a liquid reducing agent, such as the urea water or the like. In order to enhance the purifying efficiency of a nitrogen oxide reduction catalytic converter disposed in an exhaust passage, this apparatus adopts a configuration in which the liquid reducing agent is added into the exhaust gas during passing through a certain section of the exhaust passage that is arranged on the upstream side of the nitrogen oxide reduction catalytic converter, In such an exhaust emission purifying apparatus using the liquid reducing agent, in the case where the urea water is used as the liquid reducing agent thereof, countermeasures against freezing of the liquid reducing agent must be made on piping through which the urea water is flown. This is because the urea water is frozen at a temperature below zero but at a relatively high predetermined temperature which might be met in rather cold weather regions.

Structures of keeping the piping warm by a heat-insulating material or heating the piping by a heater are widely adopted in fields of water supply lines, plant facilities and the like. In these known structures, a joint (including a connector and a flange) portion for connecting the pipe to the other side device or for connecting between different pipes is covered by the heat-insulating material or is wounded by a heater, separately from piping body, as disclosed in FIG. 5 and FIG. 6 of Japanese Unexamined Patent Publication No. 1992(H04)-102793.

However, the above conventional art relies on a technique on the premise of manual works, and therefore, involves an amount of efforts, and further, the stabilization of assembly quality is hard to be achieved due to individual differences in workers. Further, the entire joint portion is covered separately from the piping portion to thereby need much space, and therefore, such a conventional technology is not suitable for a pipe layout installed in an exhaust emission purifying apparatus having only a narrow disposing space.

On the other hand, in blow-by gas piping, there is also an example adopting, as a joint, a connector with a built-in heater. However, such a connector, that is, the joint with a built-in heater, is a specific component peculiarly designed for a specified engine, and accordingly, there is a problem in that the cost incurred for the molds for manufacturing the component must increase especially in the case of a small amount of production.

SUMMARY OF THE INVENTION

Therefore, in view of the above conventional problems, the present invention has an object to make a proposal of a heating component for a pipe joint which is able to be further easily attached compared with that in the conventional technique, and is further able to stabilize the assembly quality thereof.

Further, the present invention has an object to provide a heating component for a pipe joint which is able to be mounted on an existing joint afterwards and is able to reduce the cost such as the burden of the mold preparation cost and the like, so as to cancel any necessity for the peculiar design of the joint with a built-in heater as described above.

In order to achieve the above objects, a heating component for a pipe joint according to the present invention is characterized by comprising a configuration such that a heating wire is held in an inside of the heating component and also an internal shape is provided to have an inner surface capable of fitting on an outer shape of the pipe joint; the heating component being mounted on the joint due to fitting of the component from an exterior of the pipe joint; and the heating wire generating heat to be transmitted to the pipe joint upon being supplied with electric current.

The heating component for pipe joint as described above, is simply fitted with the joint from the exterior of the joint and therefore, may not need much space and is able to be very easily assembled with the joint. Further, since the heating component is able to be attached to the pipe joint only by a single predetermined working operation for fitting the heating component onto the pipe joint, differently from the conventional manual working operation, the quality of assembly can be stable irrespective of technical skills or experiences of operators. Furthermore, a specific joint with a built-in heater is not produced, but the heating component is able to be produced as a fitting unit with the existing joint. Therefore, the heating component is able to be attached to or mounted on an already assembled joint afterwards; and also, the mold preparation cost is able to be reduced significantly lower compared with the case of producing the exclusively used specific joint. The heating component for pipe joint of the present invention has the above-described advantages and therefore, is especially available as a heating component for a pipe joint applied to a pipe joining portion of a pipe layout in an exhaust emission purifying apparatus in which a nitrogen oxide reduction catalytic converter is disposed in an exhaust passage of an internal combustion engine and also a liquid reducing agent is added into a predetermined section of the exhaust passage located on the upstream side of the nitrogen oxide reduction catalytic converter.

With the above-described heating component for a pipe joint, a specific structural embodiment which is able to be easily produced may be structured such that the heating component for a pipe joint has partially thereon fitting portions each having an inner surface fit on a part of the outer shape of the joint, and also, a holding recess portion for holding therein the heating wire is formed on an inner surface portion other than the fitting portions, and the heating wire held in the holding recess portion comes in contact with the joint. To be more specific, in the heating component for a pipe joint according to the present invention, the fitting portions each having the inner surface fit on the part of the outer shape of the joint are partially formed thereon, and also, the holding recess portion holding therein the heating wire is formed on the inner surface portion other than the fitting portions; when the heating wire is held in the holding recess portion, and then, the heating component for a pipe joint is attached to the pipe joint by fitting the fitting portions to the parts of the outer shape of the joint, the heating wire held in the holding recess portion comes in contact with the joint; and as soon as the heating wire is supplied with electric current, heat generating in the heating wire is transmitted to the pipe joint.

According to the above structural embodiment, the heating wire is able to be removably accommodated in the holding recess portion afterwards, and a body portion of the heating component is able to be easily produced by the injection molding. Further, since the heating wire is in a direct contact with the joint, a heat transmission characteristic to the joint is enhanced, In the described embodiment of the heating component for a pipe joint. It is preferable that the holding recess portion has a mounting pedestal on a bottom face thereof, and when the heating wire is held in the holding recess portion, the heating wire is mounted on the pedestal, so that the airspace is formed between the heating wire and the holding recess portion. This airspace functions as a heat-insulating layer to prevent heat dissipation to thereby enhance the thermal efficiency. Further, it is also possible to dispose a lid member for preventing the drop-off of the heating wire on a portion, in the holding recess portion which holds the heating wire, where the heating wire is not in contact with the joint. If this lid member is made of a heat-insulating material having good-heat-insulating properties, the thermal efficiency is further enhanced.

Further, in such a heating component for a pipe joint, it is preferable to form an inclined guide for conducting lead wire portions of the heating wire, which is to be extended to the outside, in an outward direction of piping diameter so as to curve or curl back against a plane in which the heating wire lies. Namely, in the case where the piping diameter is larger than that of the pipe joint as a result that the heat-insulating material is wound around the piping, by collecting up the heating-wire-lead portions extended from the heating component by the inclined guide to thereby guide them outwardly in the diameter direction, it is possible to make the handling of the heating-wire-lead portions easy and also to prevent the breaking thereof.

The heating component for a pipe joint of the present invention is able to be attached to the pipe joint by the simple working of only fitting the heating component to the existing joint and therefore, by omitting extra manual works, the quality of assembly can be stable without any influence of individual differences such as experiences and the like. Further, the heating component for a pipe joint of the present invention may not need much space compared with the conventional structure in which the heat-insulating material or the heater is wounded around the joint by the manual works, and therefore, is suitable especially for the pipe layout arranged in the exhaust emission purifying apparatus having a narrow disposing space. Furthermore, since the heating component for a pipe joint of the present invention can be attached to the existing joint afterwards, it is possible to reduce the cost, such as the mold preparation cost and the like compared with the case where the exclusively used specific joint with a built-in heater is produced.

Still further, according to the present invention, in a pipe layout structure for the exhaust emission purifying apparatus using the liquid reducing agent, the heating of a joint portion as well as the heating of piping portion, can be reliably performed, so that over the total piping length, the heating is able to be uniformly accomplished without causing appearance of any defective portions in heat retainment and defrosting.

In the conventional piping structure for the exhaust emission purifying apparatus, there has been also taken a method in which, without disposing the heater to the joint portion, the heater wattage of the piping portion is increased, to thereby help the heating of the joint portion without provided with the heater. However, according to the present invention, compared with such a conventional method in which the total wattage is increased at the heat-retaining or defrosting time, the power consumption can be surely reduced to be lower, and if the wattage in the present invention is same as that in the conventional method, a time for heat-retaining or defrosting can be shortened. Namely, for the limit generator capacity, the unnecessary power consumption is able to be appreciably suppressed.

DESCRIPTION OF THE PREFERRED EMBODIMENTS

Hereunder, there will be described embodiments of the present invention based on FIG. 1 through FIG. 6.

Figure 1:
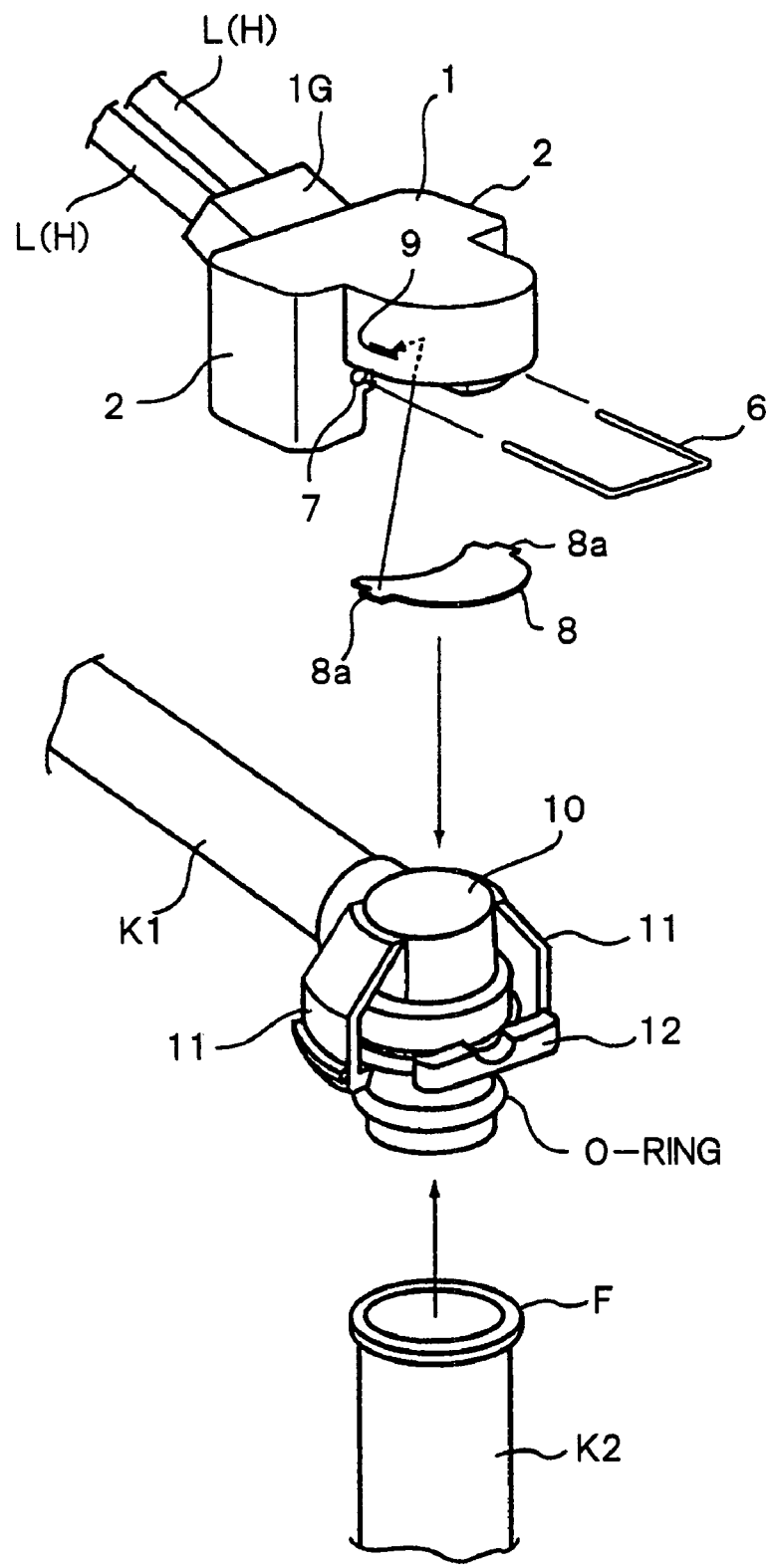
FIG. 1 is a perspective view showing an embodiment of the present invention.
Figure 2:
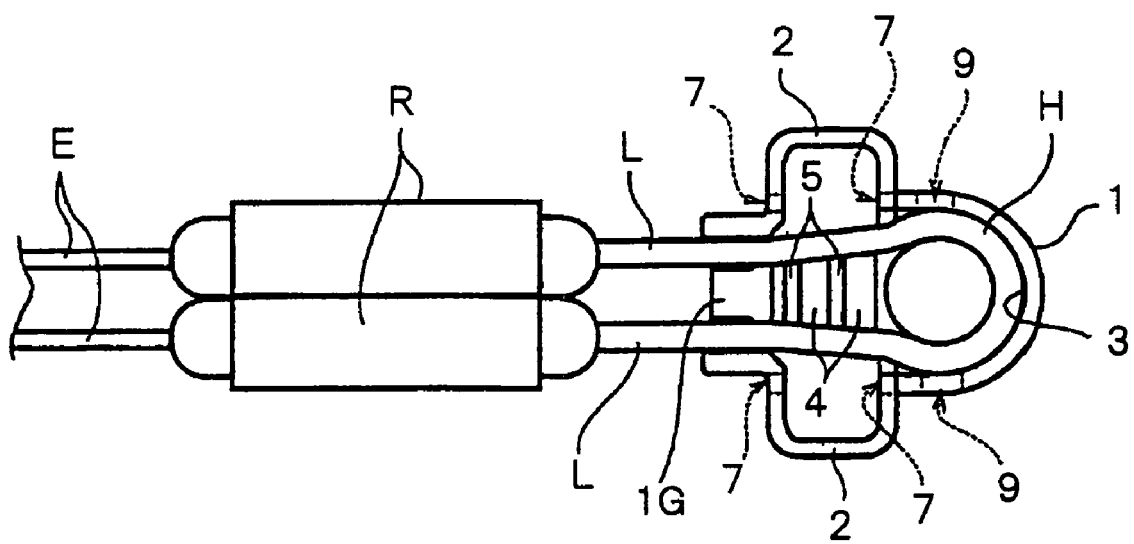
FIG. 2 is a plan view of a heating component for a pipe joint in FIG. 1.
Figure 3:
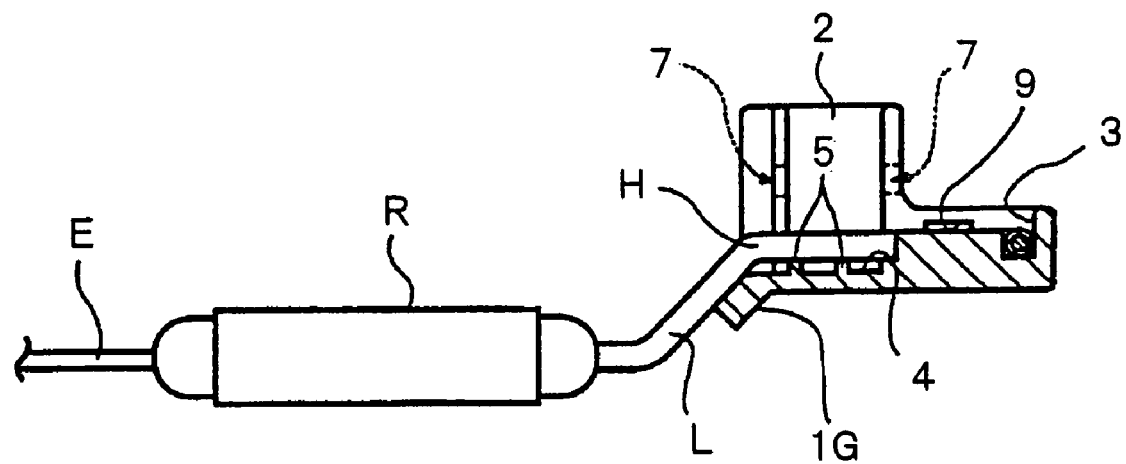
FIG. 3 is a cross section view of the heating component for a pipe joint in FIG. 2.
Figure 4:
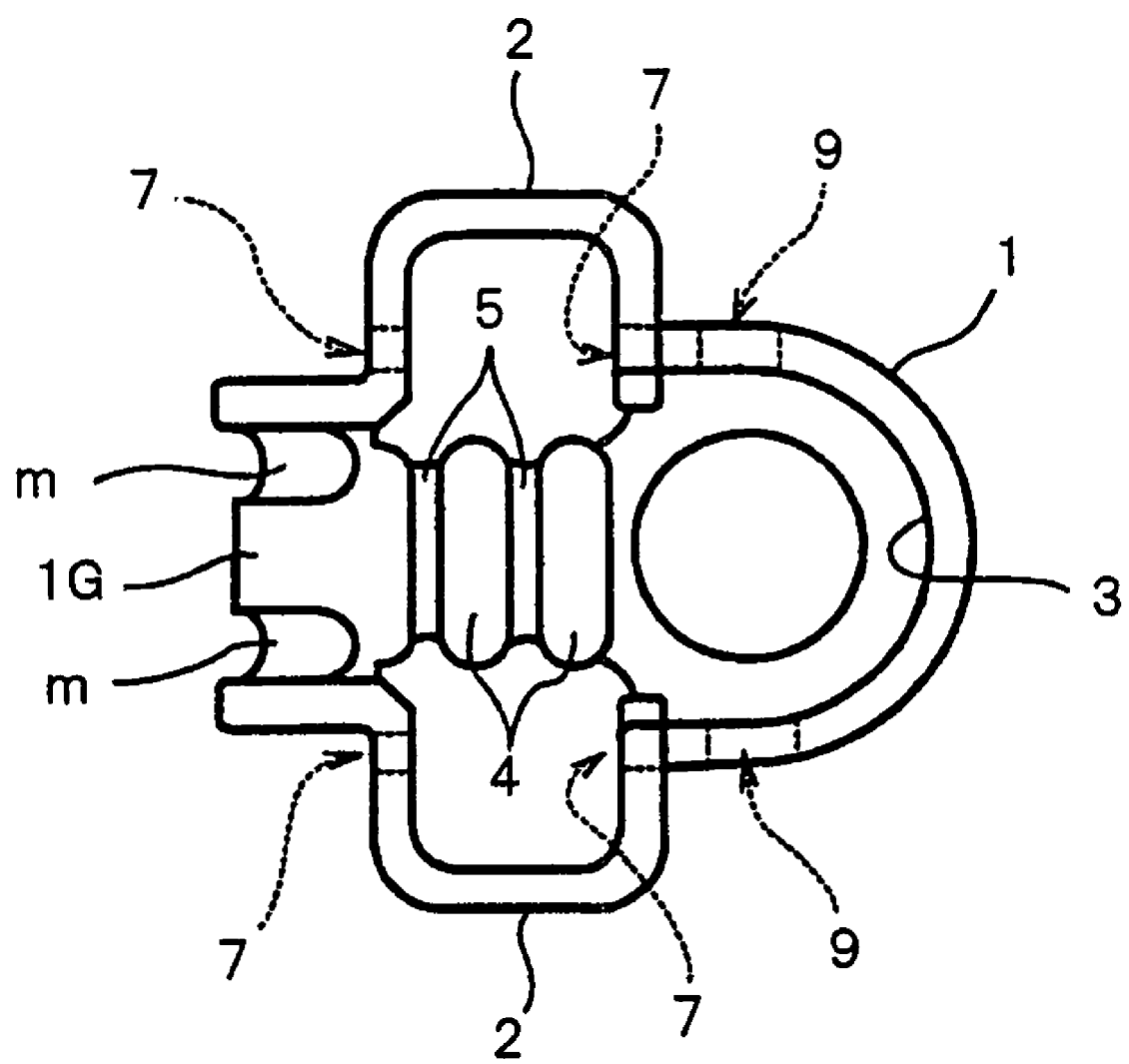
FIG. 4 is a plan view showing the heating component for a pipe joint in FIG. 1 except for a heating wire.
Figure 5:
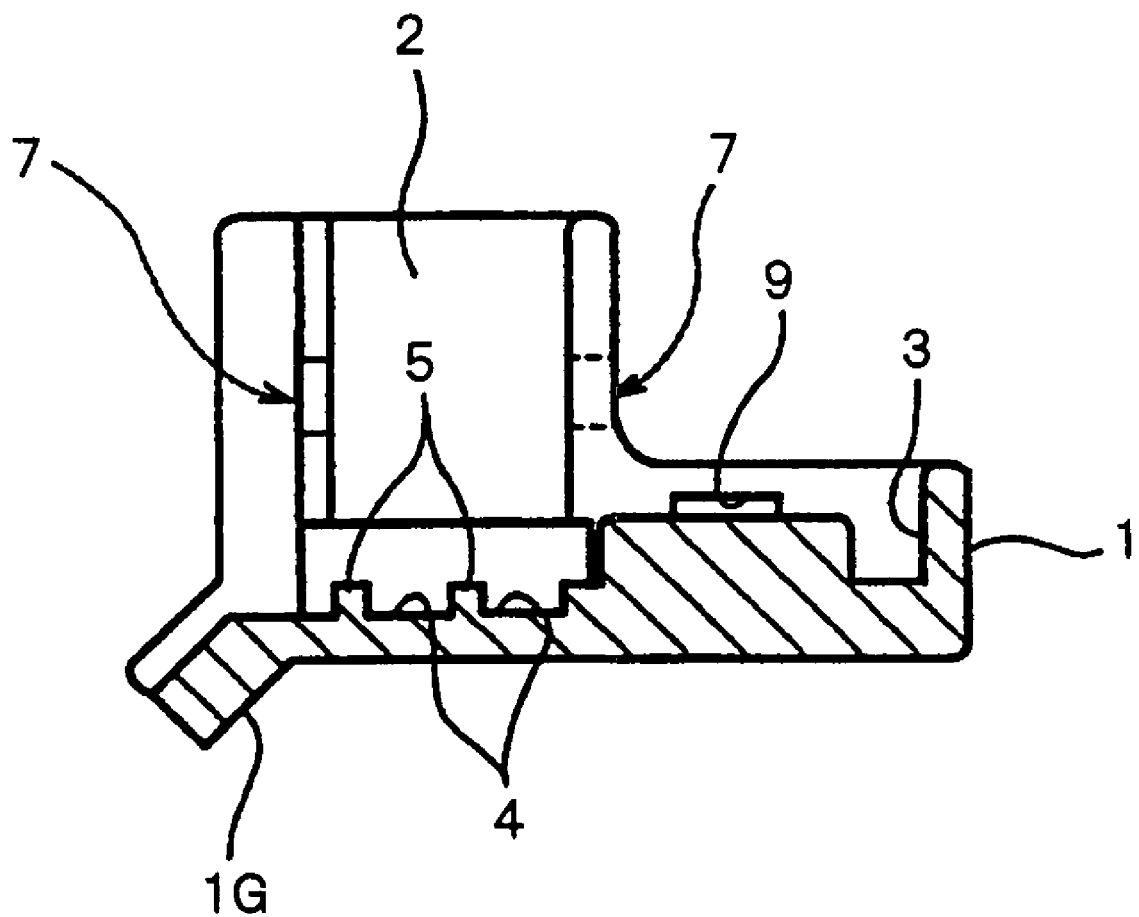
FIG. 5 is a cross section view of the heating component for a pipe joint in FIG. 4.
Figure 6:
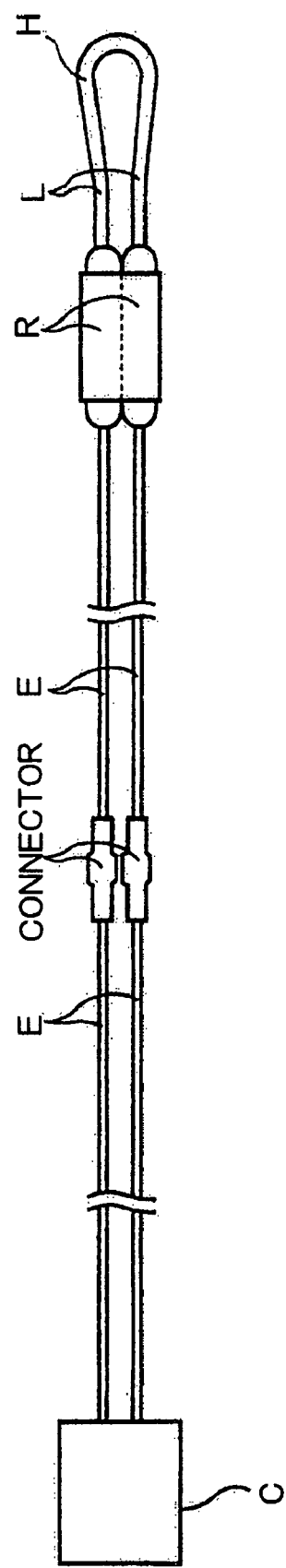
FIG. 6 is a plan view showing the whole heating wire.

FIG. 1 is an exploded perspective view showing heating component for a pipe joint 1 and a joint 10, FIG. 2 is a plan view of the heating component for a pipe joint 1 which holds therein a heating wire H, and FIG. 3 is a cross section view of the heating component for a pipe joint 1 shown in FIG. 2. FIG. 4 is a plan view showing the heating component for a pipe joint 1 from which the heating wire H is removed, FIG. 5 is a cross section view of the heating component for a pipe joint 1 shown in FIG. 4, and FIG. 6 is an overall diagram of the heating wire H.

The heating component for a pipe joint 1 in the present embodiment, being a resin molded product having a unitary body, is to be mounted on and attached to an elbow type joint 10 which connects between two pipes K1 and K2 at 90°, and has, at two sites thereof, fitting portions 2 each having an inner surface suitable for being fit on a part (a claw portion 11 in the present embodiment) of an outer shape of the joint 10. Further, on an inner surface portion of the heating component for a pipe joint 1 other than the fitting portions 2 a holding recess portion 3 is formed. The holding recess portion 3 has a pedestal 5 formed on a bottom face 4 thereof, and a heating wire H is put on the pedestal 5 so that a space is formed between the heating wire H and the bottom face 4, thereby the airspace being formed.

The heating wire H is held so as to be laid in a U-shape in the holding recess portion 3. Further, lead portions L of both end portions of the heating wire H are extended to the outside of the heating component 1, to be connected via a resistor R to electric wiring E which is connected to a coupler C. This heating wire H is appropriately controlled by, for example, a control unit (ECU) of an exhaust emission purifying apparatus, in accordance with the outside air temperature, the tank internal temperature of a liquid reducing agent or the like.

The joint 10 is attached to the first pipe K1, and the second pipe K2 disposed at 90° relative to the first pipe K1 is connected to the joint 10. On a periphery of an opening portion of the second pipe K2, a flange F is formed, and on an outer periphery of the joint 10, the claw portions 11 for latching the flange F are disposed at two sites at 180° intervals. Accordingly, when the second pipe K2 is inserted into the joint 10, the flange F is latched by the claw portions 11 at two sites, so that the second pipe K2 is prevented from being extracted, and then, the second pipe K2 is fixed to the joint 10. Further, in the present embodiment, since a latch release button 12 is disposed on the joint 10, when the latch release button 12 is pushed inwardly, the claw portions 11 are expanded, so that the latch between the claw portions 11 and the flange F is released, and consequently, the second pipe K2 is able to be extracted from the joint 10.

These pipe K1 and K2 are, as one example, those for transporting the liquid reducing agent from a tank preserving the liquid reducing agent, in an exhaust emission purifying apparatus in which a nitrogen oxide reduction catalytic converter is disposed in an exhaust passage of an internal combustion engine and also the liquid reducing agent is added into the exhaust passage on the upstream side of the nitrogen oxide reduction catalytic converter. As the liquid reducing agent, for example, the urea water for the selective catalytic reduction (SCR) as described in the above is used.

Each of the fitting portions 2 at two sites in the heater component for a pipe joint 1 is formed to have the inner surface fitted with the claw portion 11 disposed on the outer periphery of the joint 10. Accordingly, the heater component for a pipe joint 1 holding the heating wire H in the holding recess portion 3 thereof is able to be easily attached to the joint 10, only by allowing the heater component for pipe joint 1 to be placed on the joint 10 covering the latter, until the fitting portions 2 are fitted with the claw portions 11. After the attaching, when a clip 6 is inserted into insertion holes 7 to pass through the insertion holes 7 to an opposite side, the clip 6 enters into the claw portions 11 of the joint 10 to be latched. As a result, it is possible to achieve the further reliable drop-off prevention so that the heating component for a pipe joint 1 would not be dropped off from the joint 10.

In the present embodiment, a stainless-steel lid member 8 is attached to cover a part of the holding recess 3, so that the heater wire H held in the holding recess 3 can be further reliably prevented from being dropped off. Namely, two mounting pieces 8a protruding from side portions of the lid member 8 are latched onto two latch holes 9 bored on the side wall which forms the holding recess 3, of the heater component 1, so that the lid member 8 is fixed to cover the holding recess 3. The lid member 8 has a role of covering the U-shaped folded portion (the portion which is not in contact with the joint 10) of the heater wire H to prevent the drop-off of the heater wire H, and at the same time, has a role of reducing the heat dissipation from the covered portion to the outside to enhance the thermal efficiency. In order to play these roles, a material having a further heat-insulating effect, for example, glass or ceramic, may be used as the material of the lid member 8.

Further, in the heater component for a pipe joint 1 in the present embodiment, an inclined guide 1G is formed on the site at which the lead portions L of the heater wire H are extracted from the holding recess 3. This inclined guide 1G is disposed for laying thereon the lead portions L so that the lead portions L face outwardly in a diameter direction of the first pipe K1. Namely, in the case where a heat-insulating material (not shown in the figures) is wound around the first pipe K1 and accordingly, a diameter of the first pipe K1 inclusive of the heat-insulating material is larger than that of the pipe joint 10, the inclined guide 1G guides to collect up the lead portions L so that the lead portions L of the heater wire H is diverged outwardly from the first pipe K1 in the direction of diameter of that first pipe. As a result, there are provided such advantageous effects that the handling of the lead portions L is made easier and also that the lead portions L are prevented from being folded steeply at an edge of the heater component 1. On an inner face portion of such an inclined guide 1G, there is formed a semicircular guide groove m for holding therein the lead portions L, so that the holding performance for the lead portions L is further improved.

Explaining the assembling procedure of the pipe joint heater component 1 having the above configuration, firstly, the heater wire H is run in U-shaped to be held in the holding recess 3 of the pipe joint heater component 1. The heater wire H held in the holding recess 3 is put on the pedestal 5 so that the airspace is formed between the heater wire H and the bottom face 4. Subsequently, the latch pieces 8a are latched onto the latch holes 9 to thereby mount the lid member 8 to the heater component for a pipe joint 1, thereby preventing the drop-off of the heater wire H. Then, the heater component for a pipe joint 1 is placed on the joint 10 to be mounted to the joint 10, by fitting the fitting portions 2 of the heater component for a pipe joint 1 with the claw portions 11 of the joint 10. Next, the clip 6 is inserted into the insertion holes 7 to be fixed so that the pipe joint heater component 1 is not dropped off from the joint 10.

When the heater component for a pipe joint 1 is mounted on the joint 10, the portion of the heater wire H, which is supported by the pedestal 5 in the holding recess 3 surely comes in contact with the joint 10. Accordingly, when the electric power is supplied to the heater wire H, the heat of the heater wire H which generates the heat with the electric power supply, is transmitted to the joint 10.

In this mounding work, even in the cases where the heat-insulating material is wound around the first pipe K1 and the diameter of the first pipe K1 is large, since the lead portions L of the heater wire H are guided by the inclined guide 1G to be collected up without being cluttered and also the steeply folding thereof is prevented, the handling thereof is made easy and also a possibility of the breaking thereof is reduced.

In the above description, there has been described the example of the pipe joint heater component for the joint which connects the two pipes at 90°. However, the present invention is not limited thereto, and can be surely applicable to a joint connecting two pipes at 180° or other angles, or to a joint connecting three or four pipes.

We claim:

1. A heating component for a pre-existing pipe joint, comprising:
    a heating wire including a first lead portion, a U-shaped portion and a second lead portion;
    a top portion including a bottom face, a pedestal to support the first and second lead portions of the heating wire and a U-shaped holding recess to support the U-shaped portion of the heating wire;
    side portions, depending from the top portion, each having an inner face shape-fitted with a corresponding part of the pipe joint; and
    a lid member, attached to the top portion, for securing the U-shaped portion of the heating wire within the U-shaped recess,
    wherein, when the heating component is mounted on the pipe joint, the first and second lead portions of the heating wire contact the pipe joint, the U-shaped portion of the heating wire does not contact the pipe joint, and the heating wire warms the pipe joint when supplied with electric current.

2. The heating component according to claim 1, wherein said lid member is formed of a heat-insulating material.

3. The heating component according to claim 1, further comprising an inclined guide formed for laying thereon lead wire portions of said heating wire so that said lead wire portions are diverged outwardly from a pipe in a direction of a diameter of the pipe.

4. The heating component according to claim 1, wherein said corresponding part is a claw portion of said pipe joint.

5. A heating component for a pre-existing pipe joint, comprising:
- a heating wire including a first lead portion and a second lead portion that contact the pipe joint when the heating component is mounted on the pipe joint, and a U-shaped portion that does not contact the pipe joint when the heating component is mounted on the pipe joint;
- a top portion including a bottom face, a pedestal to support the first and second lead portions of the heating wire and a holding recess to support the U-shaped portion of the heating wire;
- side portions, depending from the top portion, each having an inner face shape-fitted with a corresponding part of the pipe joint; and
- a lid member, attached to the top portion, for securing the U-shaped portion of the heating wire within the holding recess, wherein, subsequent mounting of the heating component on the pipe joint due to fitting of the side portions with the respective corresponding parts of the pipe joint causes the first and second lead portions of the heating wire to be in contact with the pipe joint, and wherein, when the heating component is mounted on the pipe joint, the heating wire warms the pipe joint when supplied with electric current.

6. The heating component according to claim 5, wherein said lid member is formed of a heat-insulating material.

7. The heating component according to claim 5, further comprising an inclined guide formed for laying thereon lead wire portions of said heating wire so that the lead wire portions are deviated outwardly from a pipe in direction of a diameter of the pipe.

8. The heating component according to claim 5, wherein said corresponding part is a claw portion of said pipe joint.

* * * * *